(12) United States Patent
Matsumoto

(10) Patent No.: US 7,874,745 B2
(45) Date of Patent: Jan. 25, 2011

(54) LOCK MECHANISM, SLIDE APPARATUS, AND MOBILE HANDSET APPARATUS

(75) Inventor: Masao Matsumoto, Tokyo (JP)

(73) Assignee: Sony Ericsson Mobile Communications AB, Lund (SE)

( * ) Notice: Subject to any disclaimer, the term of this patent is extended or adjusted under 35 U.S.C. 154(b) by 90 days.

(21) Appl. No.: 12/401,984

(22) Filed: Mar. 11, 2009

(65) Prior Publication Data

US 2009/0252487 A1    Oct. 8, 2009

(30) Foreign Application Priority Data

Apr. 2, 2008   (JP) ............................. 2008-095765

(51) Int. Cl.
*G03B 17/00* (2006.01)
*E05B 65/08* (2006.01)

(52) U.S. Cl. .................. 396/448; 348/373; 359/808; 70/95

(58) Field of Classification Search ............... 396/448; 348/373, 375; 359/611, 612, 738, 808; 70/95
See application file for complete search history.

(56) References Cited

U.S. PATENT DOCUMENTS 6,036,376 A * 3/2000 Owashi et al. ............... 396/448
6,151,455 A * 11/2000 Mikami et al. .............. 396/448
7,722,263 B2 * 5/2010 Izumi et al. ................. 396/448
2006/0073858 A1   4/2006 Nagashima
2006/0135221 A1   6/2006 Lim

FOREIGN PATENT DOCUMENTS

JP   2007-65443   3/2007

* cited by examiner

*Primary Examiner*—Christopher E Mahoney
*Assistant Examiner*—Autumn Parker
(74) *Attorney, Agent, or Firm*—Oblon, Spivak, McClelland, Maier & Neustadt, L.L.P.

(57) ABSTRACT

A lock mechanism for a sliding object includes a slide arm, a rotating lever, and urging means. When an external pressing force presses the slide arm member in opposition to an urging force imparted by the urging means, the slide arm member is moved along a slide path, thereby causing the rotating lever member to rotate. When the slide arm member is pressed further, the tip of the rotating lever member rides onto and is stopped against the lateral surface of the slide arm member, such that the slide arm member and the rotating lever member remain stopped at the current position even if the pressing force is released.

10 Claims, 14 Drawing Sheets

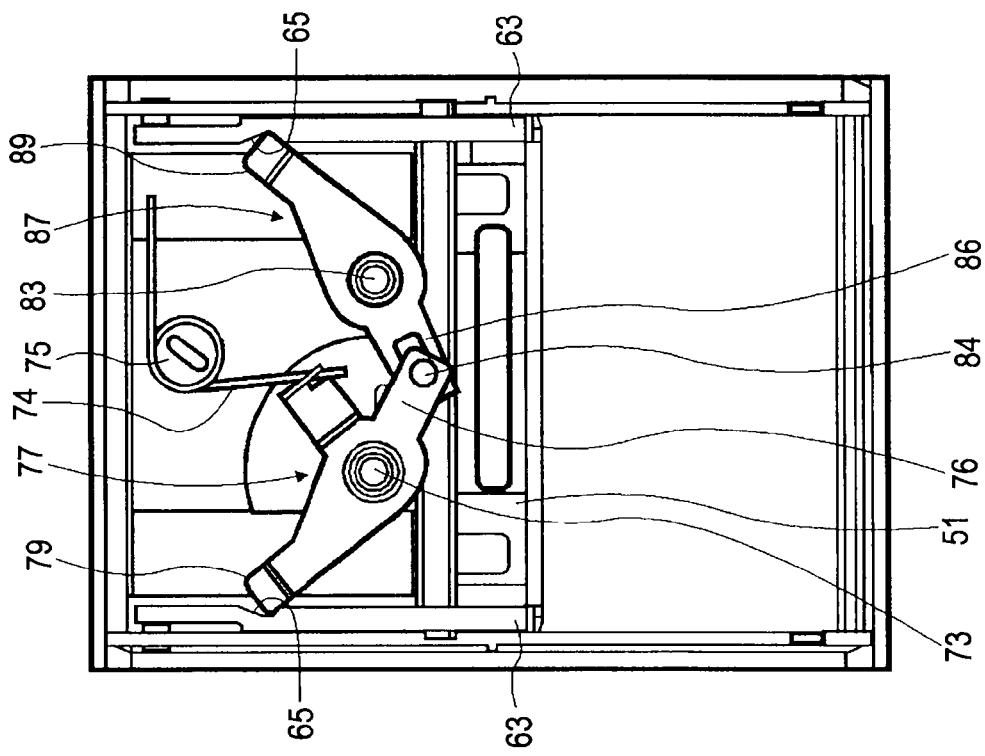
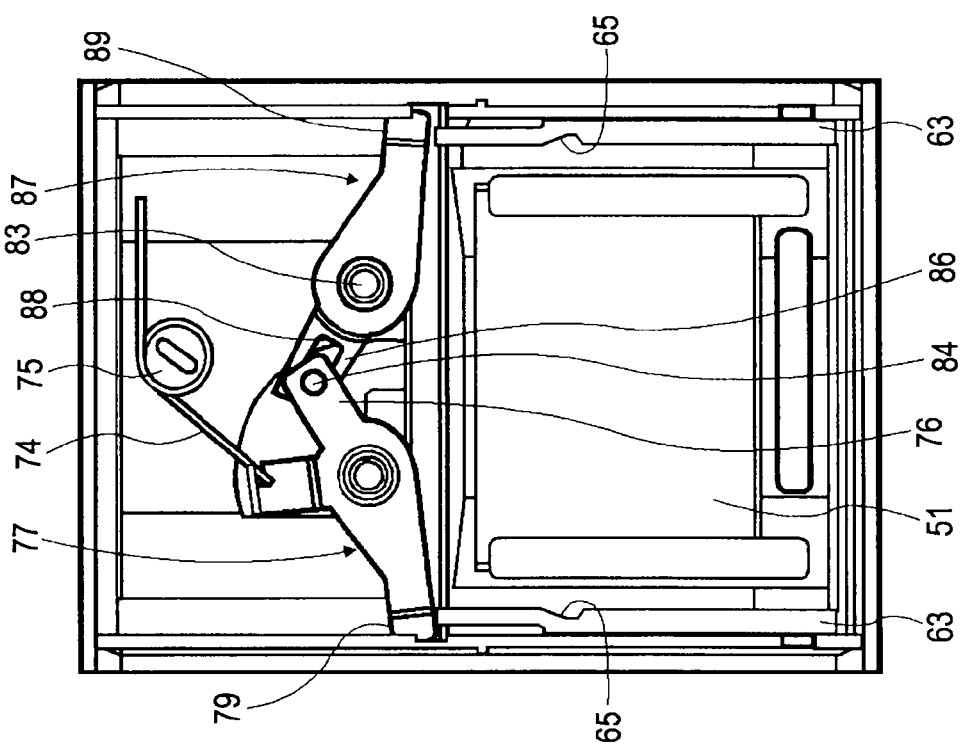

LOCK MECHANISM, SLIDE APPARATUS, AND MOBILE HANDSET APPARATUS

BACKGROUND OF THE INVENTION

1. Field of the Invention

The present invention relates to a slide apparatus and mobile handset having a sliding object that slides along a predetermined slide path, wherein the sliding object is stably held at two points on the slide path. More particularly, the present invention relates to a lock mechanism for realizing a function like the above.

2. Description of the Related Art

FIG. 1 illustrates a schematic configuration of a mobile phone or similar mobile device provided with a camera unit 12 housed in a chassis 13, as well as a cover 11 (the sliding object herein) that selectively covers the lens unit of the camera unit 12 in order to protect the lens unit. When the camera of the mobile device is not in use, the camera unit 12 is closed and covered by the cover 11, as shown in FIG. 1A. The cover 11 is slidably supported by the chassis 13, such that when the user applies an external force F1 to the cover 11, the cover 11 is moved to the open position. As shown in FIG. 1B, when the cover 11 is opened by sliding, the camera unit 12 appears and taking photographs becomes possible.

In order to prevent the cover 11 from accidentally sliding, a control mechanism is normally installed whereby the open position and the close position of the cover 11 are held in place by some means like the following. FIGS. 2A and 2B illustrate an exemplary configuration of a mobile device having a position control mechanism of the related art, the mechanism herein providing a click response in addition to position control. The position control mechanism shown in FIGS. 2A and 2B includes a spherical part 23 that is pressed against the inner wall of the cover 11 in both the open position and the close position as a result of the press force F3 of a push spring 24. Provided on the inner wall of the cover 11 are recessed portions 21 and 22, into which the spherical part 23 enters during the close position and the open position, respectively. Click response is produced as a result of the spherical part 23 entering the recessed portions 21 and 22, while additionally, the above functions as a lock configuration whereby the cover 11 is not moved accidently. In addition to the above, a lens cover configuration provided with an independent click mechanism has also been proposed (see Japanese Unexamined Patent Application Publication No. 2007-65443).

However, in the mobile device shown in FIGS. 2A and 2B, the click function occurs only at the ends of a slide stroke, and cover position control at a position midway along the slide stroke has been difficult to implement.

FIGS. 3A and 3B illustrate the configuration of a mobile device of the related art having improved usability. The mobile device shown in FIGS. 3A and 3B includes a spring (not shown) that generates a closing force in a particular direction so as to keep the cover 11 in the closed state. As a result of the closing force F5 generated by the spring, the cover position is controlled such that the cover 11 is not accidently slid from the close position. When the user slides the cover 11 by applying an external force F4 sufficient to overcome the closing force F5 of the spring, the spring is compressed. The spring becomes maximally compressed in the open position and thereby stores a force F6. At this point, when the external force F4 is removed, the cover automatically returns from the open position to the close position. In so doing, usability is improved. However, when usage of the camera unit 12 is considered with respect to the mobile device shown in FIGS. 3A and 3B, it is desirable to install a lock mechanism for the cover 11 when in the open position.

FIGS. 4A, 4B, and 4C illustrate a mobile device wherein a lock mechanism 40 for the cover 11 has been provided with respect to the mobile device shown in FIGS. 3A and 3B. When the user moves the cover 11 to the open position by applying an external force F7, the lock mechanism 40 engages a protruding portion 11a of the cover 11 such that the cover 11 remains in the open position even when the user ceases to apply the external force F7. When the user subsequently rotates the lock mechanism 40 about an axis 41 by applying an external force F10 to the lock mechanism 40, the cover 11 is disengaged from the tip 42 of the lock mechanism 40 and is automatically returned to the initial position by means of the closing force F11 of the spring.

SUMMARY OF THE INVENTION

However, the mobile device shown in FIGS. 4A, 4B, and 4C also involves preparing an independent lock mechanism. The lock mechanism 40 is also preferably of sufficient strength to withstand the spring force F9 generated by the internal spring at the position of maximum compression without warping or otherwise deforming. Moreover, it is also preferable to set the strength of the lock mechanism 40 in consideration of environmental factors such as high and low temperatures, while also optimizing the touch response of the lock mechanism operating force when the lock mechanism 40 is operated by the user. As a result of the above, the device becomes more complex. Furthermore, if the user-operated portion of the lock mechanism is enlarged to improve usability thereof, the lock mechanism may not only become a hindrance, but also be susceptible to damage from drop impact or similar events.

In contrast, the present invention maintains automatic sliding of the sliding object to one end of the slide path, while also realizing a lock state at the other end of the slide patch without installing a lock mechanism as a separate component.

A lock mechanism in accordance with an embodiment of the present invention is a lock mechanism for a sliding object, and is provided with: a slide arm member configured to support the sliding object and to be slidable along a predetermined slide path; a rotating lever member having a tip that abuts one end of the slide arm member and configured to rotate about a fixed rotational axis; and urging means configured to apply an urging force that causes the rotating lever member to rotate in a given direction such that the slide arm member is urged along the slide path and toward one end thereof. When an external pressing force presses the slide arm member in opposition to the urging force of the urging means, the slide arm member is moved along the slide path, thereby causing the rotating lever member to rotate in the direction that is the opposite of the given direction. When the slide arm member is additionally and continuously pressed, the tip of the rotating lever member rides onto and is stopped against the lateral surface of the slide arm member, such that the slide arm member and the rotating lever member remain stopped at the current position even if the pressing force is released.

The sliding object is thus urged along the slide path and toward one end thereof via the slide arm member, the urging being the result of the rotating lever member to which an urging force has been imparted by the urging means. If no external force is at work, then the sliding object is maintained at this first stable position. When an external pressing force presses the slide arm member in opposition to the urging force of the urging means, the rotating lever member is made to rotate in the direction opposite to the given direction. When the slide arm member is continuously pressed, the tip of the rotating lever member rides onto and is stopped against the lateral surface of the slide arm member. At this point, the sliding object enters a locked state such that the slide arm member and the rotating lever member remain stopped at the current position even when the pressing force is released. The above is herein referred to as the second stable position. While in the second stable position, if an external force then causes the slide arm member to move back toward its original position and the tip of the rotating lever member is separated from the lateral surface of the slide arm member, then the urging force of the urging means again causes the slide arm member, and thus the sliding object, to automatically return to the original, first stable position.

An engaging portion may also be provided on the slide arm member, specifically on the lateral surface against which the tip of the rotating lever member is stopped. In so doing, the engaging portion causes the position of the slide arm member to become fixed on the slide path, while additionally, operational click response is produced.

The slide arm member may also include a first and a second slide arm member that slide in parallel, while a first and a second rotating lever member may be provided corresponding to the first and the second slide arm member. The single urging means may then be shared by both the first and the second rotating lever member. In so doing, smooth sliding movement of the sliding object is realized. Moreover, the number of component parts is reduced as a result of sharing the single urging means.

A slide apparatus in accordance with another embodiment of the present invention is a slide apparatus that stably holds a sliding object sliding along a predetermined slide path at two points on the slide path, and includes: a slide arm member configured to support the sliding object and to be slidable along a predetermined slide path; a rotating lever member having a tip that abuts one end of the slide arm member and configured to rotate about a fixed rotational axis; and urging means configured to apply an urging force that causes the rotating lever member to rotate in a given direction such that the slide arm member is urged along the slide path and toward one end thereof. When an external pressing force presses the slide arm member in opposition to the urging force of the urging means, the slide arm member is moved along the slide path, thereby causing the rotating lever member to rotate in the direction that is the opposite of the given direction. When the slide arm member is additionally and continuously pressed, the tip of the rotating lever member rides onto and is stopped against the lateral surface of the slide arm member, such that the slide arm member and the rotating lever member remain stopped at the current position even if the pressing force is released.

A mobile handset apparatus in accordance with another embodiment of the present invention includes: a camera unit; a cover able to be opened and closed with respect to the camera unit; a slide arm member configured to support the cover and to be slidable along a predetermined slide path; a rotating lever member having a tip that abuts one end of the slide arm member and configured to rotate about a fixed rotational axis; and urging means configured to apply an urging force that causes the rotating lever member to rotate in a given direction such that the slide arm member is urged along the slide path and toward one end thereof. When an external pressing force presses the slide arm member in opposition to the urging force of the urging means, the slide arm member is moved along the slide path, thereby causing the rotating lever member to rotate in the direction that is the opposite of the given direction. When the slide arm member is additionally and continuously pressed, the tip of the rotating lever member rides onto and is stopped against the lateral surface of the slide arm member such that the slide arm member and the rotating lever member remain stopped at the current position even if the pressing force is released.

Other embodiments and advantages of the present invention will be hereinafter described in detail.

According to an embodiment of the present invention, a lock mechanism and a click mechanism are provided in an integrated manner and not as independent component parts. As a result, the number of component parts can be reduced in an apparatus to which an embodiment of the present invention has been applied, while in addition, the cost and size of such an apparatus can also be reduced. Moreover, not only can the design period for such an apparatus be reduced, but also the number of man-hours involved in quality assurance during the manufacture of such an apparatus.

BRIEF DESCRIPTION OF THE DRAWINGS

FIG. 12A illustrates a modification of an embodiment of the present invention;

FIG. 12B illustrates a modification of an embodiment of the present invention;

DESCRIPTION OF THE PREFERRED EMBODIMENTS

Hereinafter, preferred embodiments of the present invention will be described in detail and with reference to the accompanying drawings.

Figure 1A:
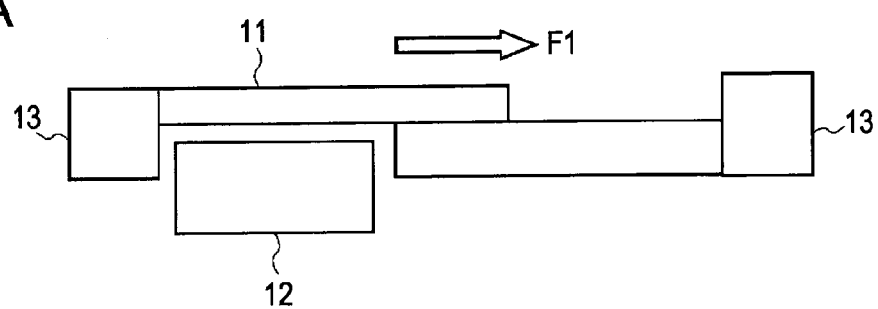
FIG. 1A illustrates a schematic configuration of a mobile device provided with a covered camera unit of the related art.
Figure 1B:
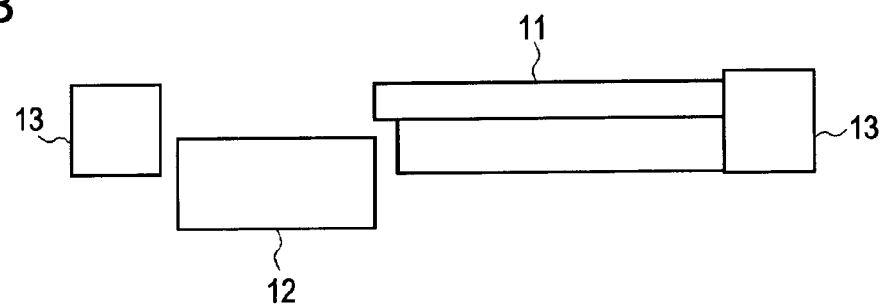
FIG. 1B illustrates a schematic configuration of a mobile device provided with a covered camera unit of the related art.
Figure 2A:
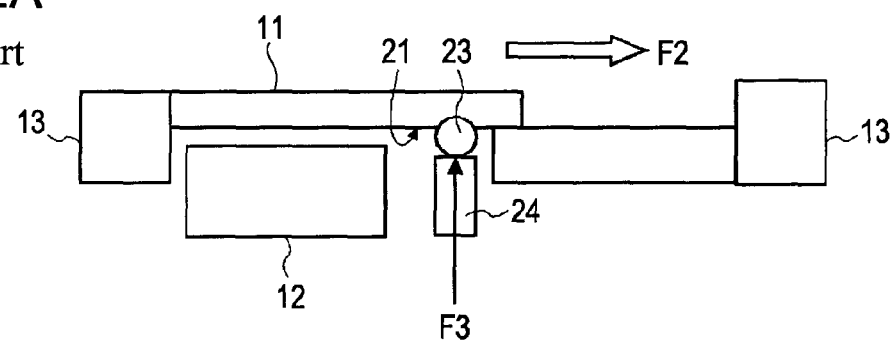
FIG. 2A illustrates the configuration of a mobile device having a position control mechanism of the related art wherein click response is produced.
Figure 2B:
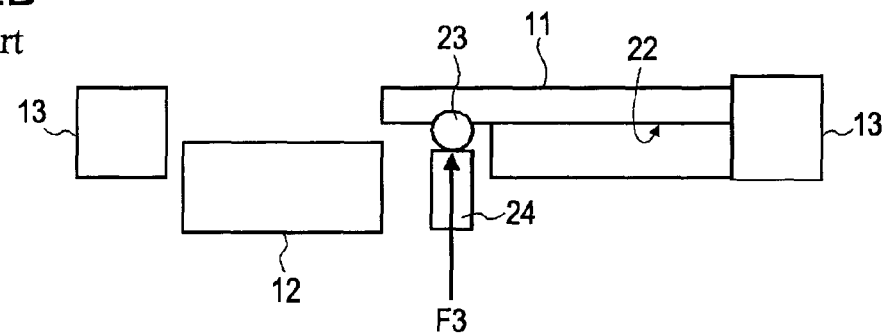
FIG. 2B illustrates the configuration of a mobile device having a position control mechanism of the related art wherein click response is produced.
Figure 3A:
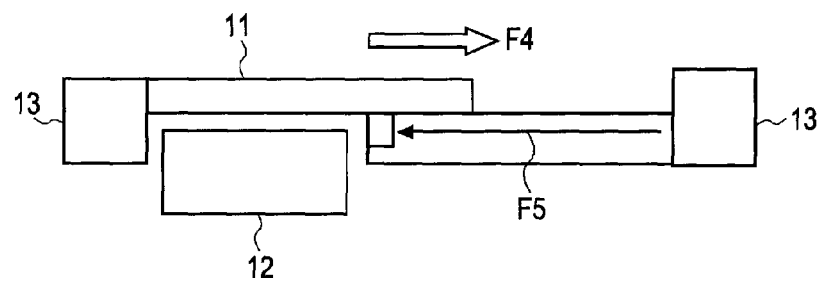
FIG. 3A illustrates a mobile device of the related art wherein usability has been improved.
Figure 3B:
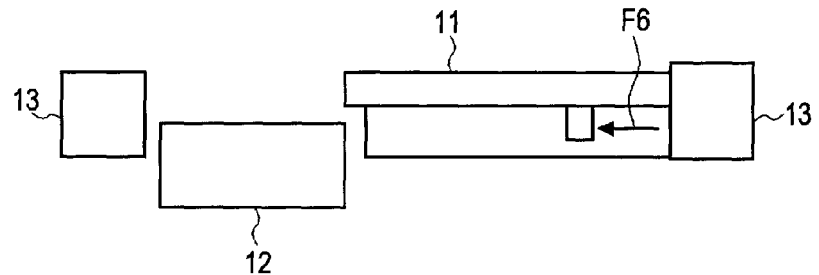
FIG. 3B illustrates a mobile device of the related art wherein usability has been improved.
Figure 4A:
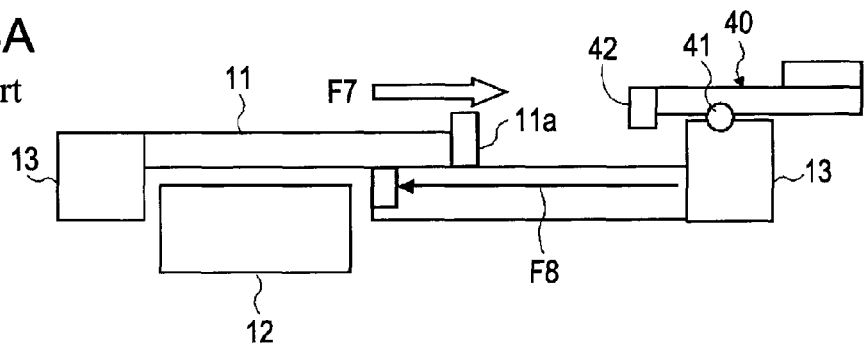
FIG. 4A illustrates the configuration of a mobile device wherein a cover lock mechanism has been provided with respect to the mobile device shown in FIGS. 3A and 3B.
Figure 4B:
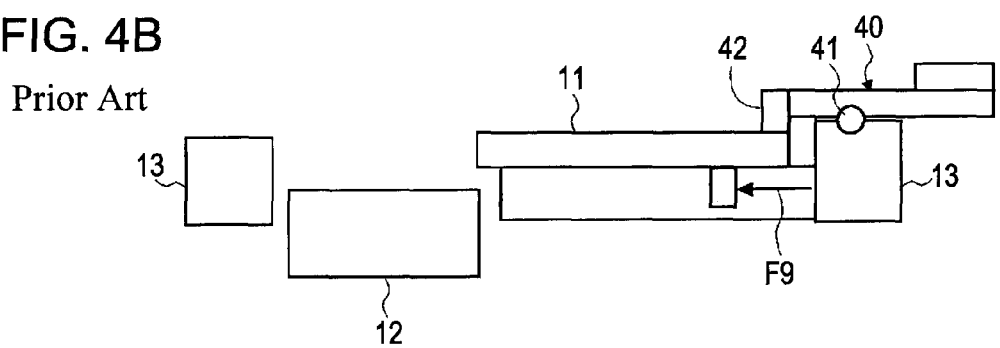
FIG. 4B illustrates the configuration of a mobile device wherein a cover lock mechanism has been provided with respect to the mobile device shown in FIGS. 3A and 3B.
Figure 4C:
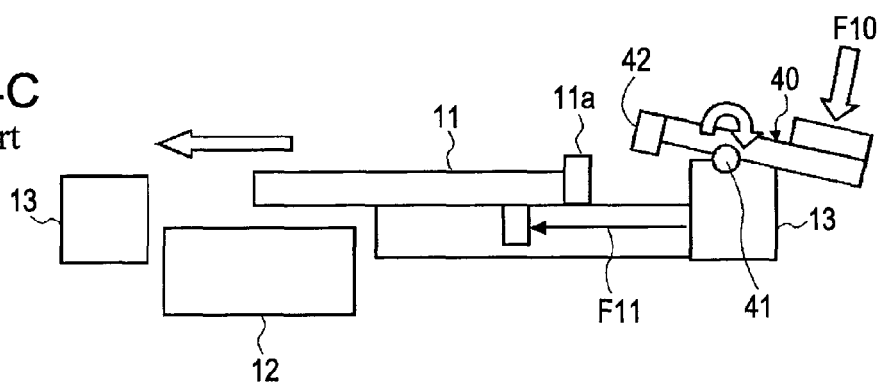
FIG. 4C illustrates the configuration of a mobile device wherein a cover lock mechanism has been provided with respect to the mobile device shown in FIGS. 3A and 3B.
Figure 5A:
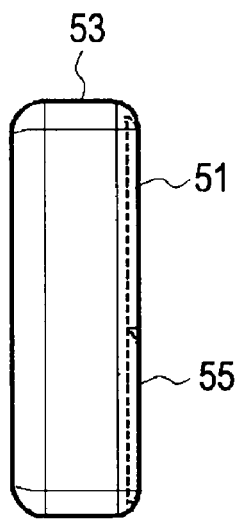
FIG. 5A is an external view of a mobile device in accordance with an embodiment of the slide apparatus of the present invention.
Figure 5B:
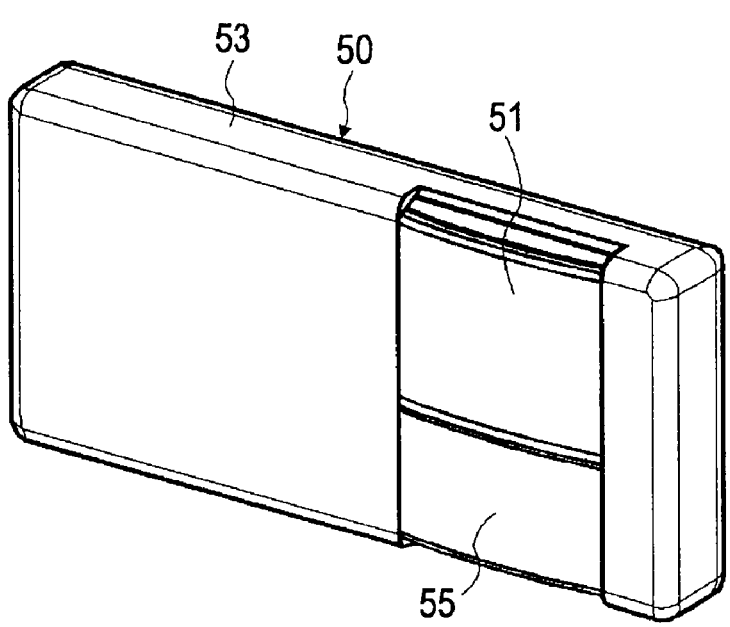
FIG. 5B is an external view of a mobile device in accordance with an embodiment of the slide apparatus of the present invention.
Figure 5C:
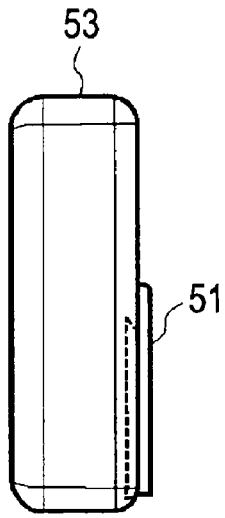
FIG. 5C is an external view of a mobile device in accordance with an embodiment of the slide apparatus of the present invention.
Figure 5D:
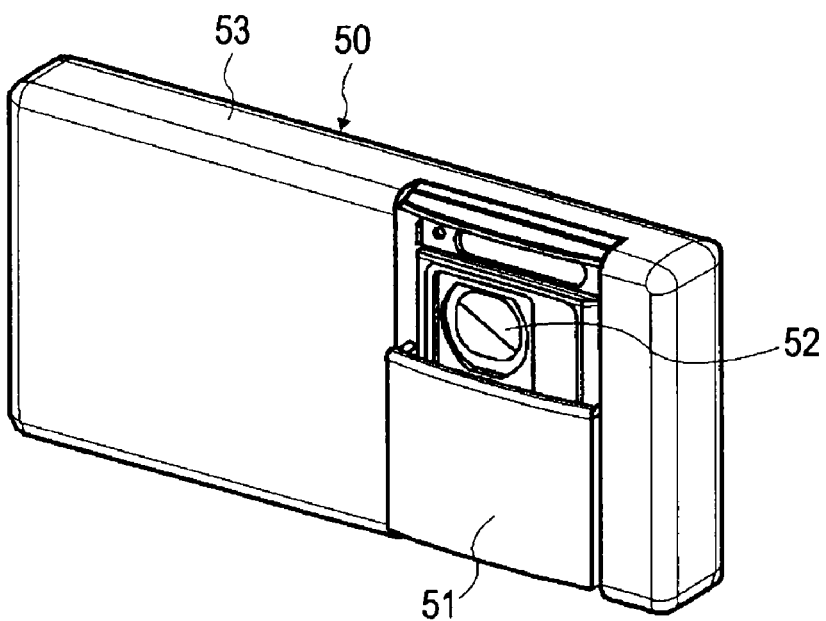
FIG. 5D is an external view of a mobile device in accordance with an embodiment of the slide apparatus of the present invention.

FIGS. 5A to 5D are external views of a mobile device 50 provided with a camera unit having a cover that can be opened and closed, and configured in accordance with an embodiment of the slide apparatus of the present invention. FIG. 5A is a left-side view showing the closed cover state wherein the camera unit 52 is closed and covered by the cover 51. FIG. 5B is a front view showing the closed cover state wherein the camera unit 52 is closed and covered by the cover 51. FIG. 5C is a left-side view showing the open cover state. FIG. 5D is a front view showing the open cover state. As long as an external force is not at work, the cover 51 is maintained in the closed state due to the urging force of an elastic member or similar urging means provided inside the device. When the user places his or her hand on the top edge or the front surface of the cover 51 and applies a pressing force so as to move the cover 51 toward a cover shelter (chassis surface) 55, the cover 51 moves in opposition to the internal urging force, and then rides onto and stops upon the cover shelter (chassis surface) 55. At the stop position the cover 51 is fully opened, thereby fully exposing the camera unit 52. Once in this open position, the cover 51 remains stopped in the open position, even if the user removes the pressing force from the cover 51 (i.e., even if the user removes his or her hand from the cover 51). The lock mechanism for realizing the above will be later described in detail.

Figure 6A:
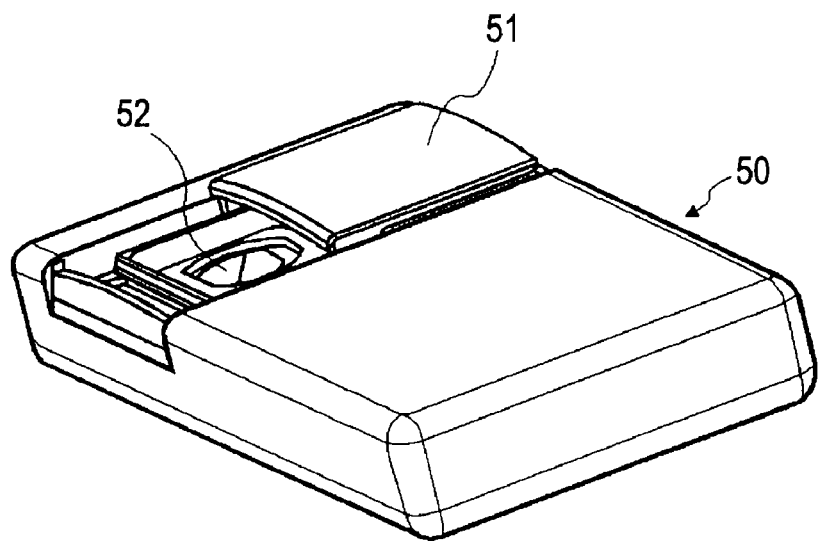
FIG. 6A is an external view of the mobile device shown in FIGS. 5A to 5D as seen from a different angle.
Figure 6B:
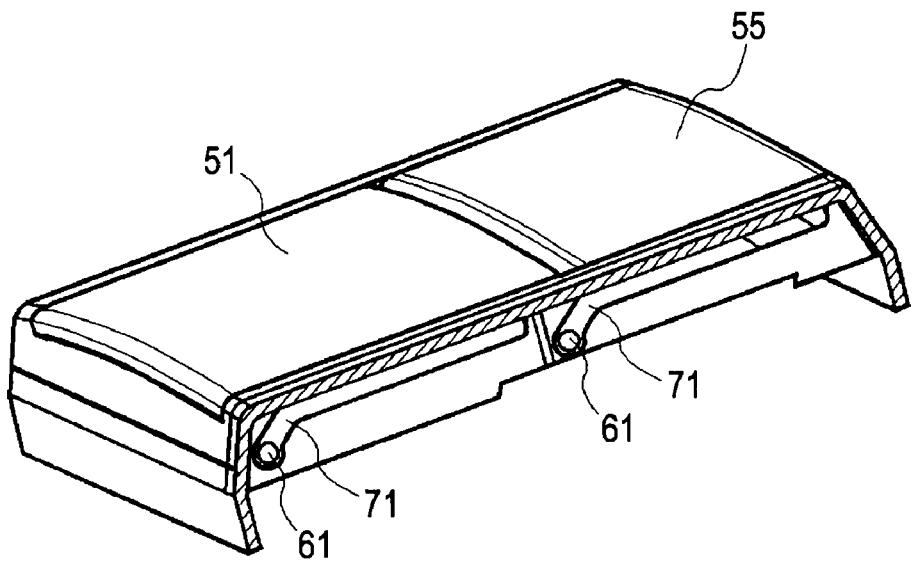
FIG. 6B is an enlarged cross-section of relevant portions of the mobile device shown in FIGS. 5A to 5D and 6A.

FIG. 6A is an external view of the mobile device 50 in the open cover state as seen from a different angle. FIG. 6B is a an enlarged cross-section showing the overall cover slide mechanism (in the closed cover state) of the present embodiment from the same angle as that of FIG. 6A. As can been understood from FIG. 6B, a total of four bosses 61 are provided in the front and rear on both sides of the cover unit that integrally supports the cover 51. The bosses 61 are then inserted into slide grooves (i.e., slide guides or grooved cams) 71. In the inserted state, the cover unit is guided and moved along the slide grooves 71. The slide grooves 71 also have a step such that the cover 51 rides onto the chassis surface when sliding from the closed position to the open position.

Figure 7:
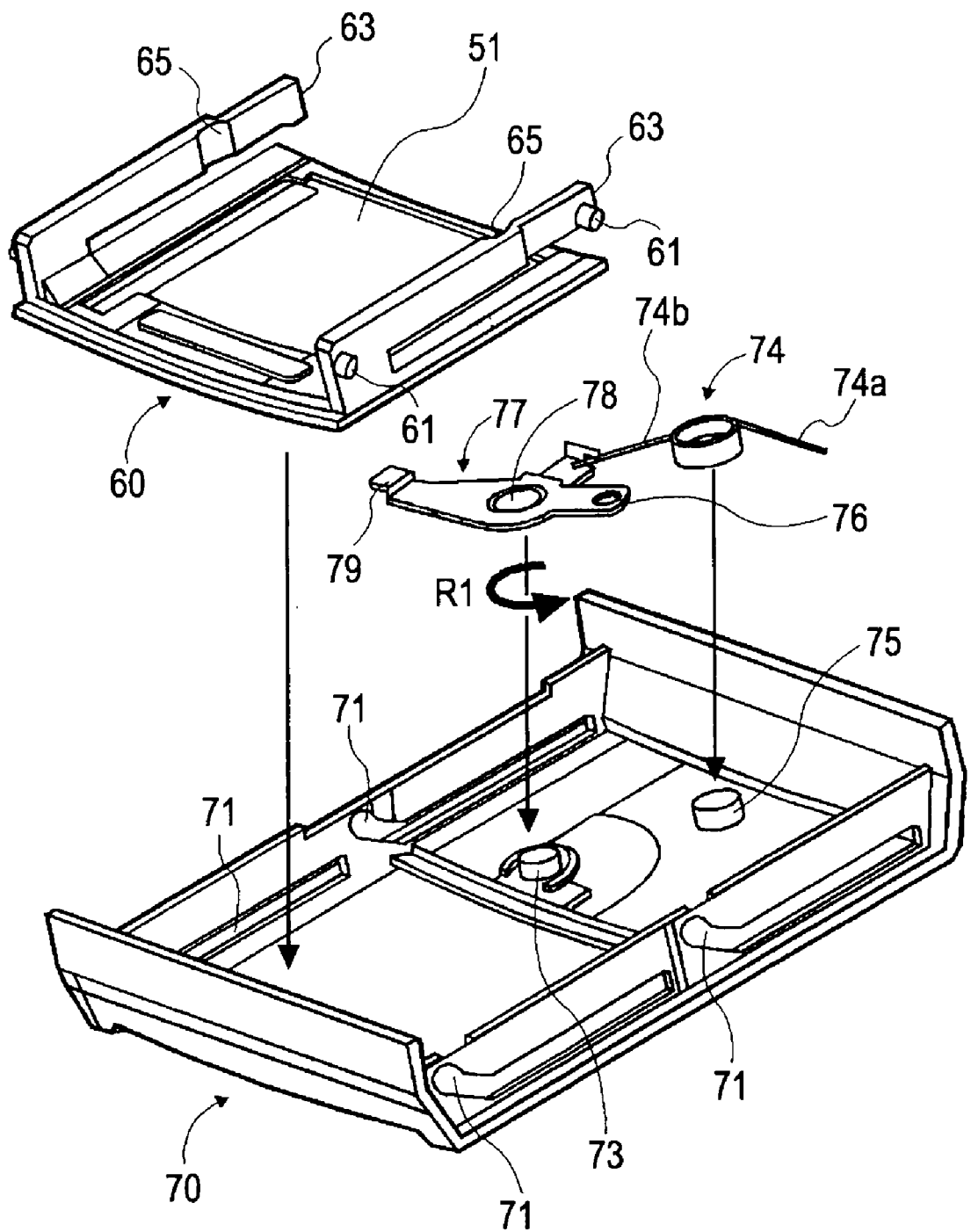
FIG. 7 is an exploded perspective view of a cover slide mechanism in accordance with an embodiment of the lock mechanism of the present invention.

FIG. 7 is an exploded perspective view of the cover slide mechanism in accordance with an embodiment of the lock mechanism of the present invention. In FIG. 7, the configuration shown in FIG. 6B has been rotated 180° about the slide direction, thereby showing the underside (i.e., the interior) of that shown in FIG. 6B. The cover unit 60 is provided with the tabular cover 51 whose surface is slightly curved, and provided on the lateral surfaces thereof is a pair of cantilevered slide arms (i.e., the slide arm member) 63. Each slide arm 63 includes a base connected to the cover 51, and a cantilevered free end extending from the base along the side of the cover. The bosses 61 are respectively provided on the lateral surface of the base and the free end of either slide arm. Herein, the individual portions of the cover unit 60 are integrally molded using a synthetic resin or similar material, but a configuration may also be used wherein a plurality of separately-formed component parts are joined together after the fact.

The cover slide support 70 is a member constituting a portion of the chassis, and includes slide grooves 71 cut into perpendicular walls on either side of the cover slide support 70 and extending in the lengthwise direction. The four bosses 61 of the cover unit 60 are inserted into the slide grooves 71, and as a result the cover unit 60 is supported by the cover slide support 70 and slidable along the slide grooves 71. On the underside of the cover shelter 55, a rotating lever 77 is rotatably supported by a support column 73 with the support column 73 as the rotational axis. In addition, a torsion spring 74 is disposed being supported by a spring support 75. The spring support 75 is a protrusion formed on the underside of the cover shelter (chassis surface) 55, similar to the support column 73. One end 74a of the torsion spring 74 is affixed to the chassis, while the other end 74b is latched against a spring catch lip (a portion of the rotating lever 77) in order to impart the urging force of the spring. As a result, rotational force is imparted to the rotating lever 77 in a counter-clockwise direction R1 about the support column 73 as viewed in FIG. 7. The lever tip 79 of the rotating lever 77 abuts the tip of one of the slide arms 63 of the cover 51. In so doing, the force of the spring 74 works in a direction that causes the cover 51 to automatically return toward the closed position.

The rotating lever 77 may also include a coupling arm 76 protruding in the direction opposite that of the tip 79. The coupling arm 76 is provided for use in a modification to be hereinafter described, and is not a necessary component of the present embodiment.

Figure 8A:
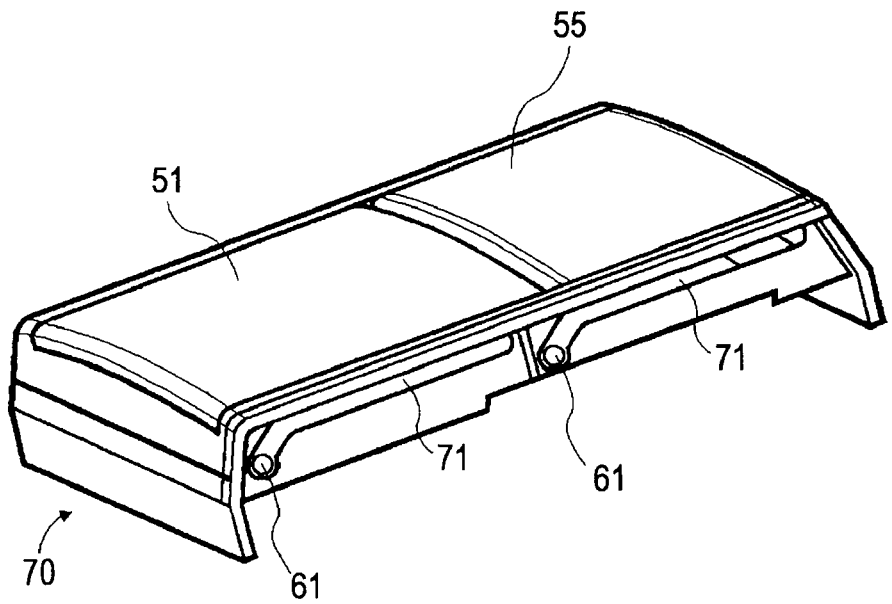
FIG. 8A illustrates the cover slide mechanism shown in FIG. 7 when the cover is closed.
Figure 8B:
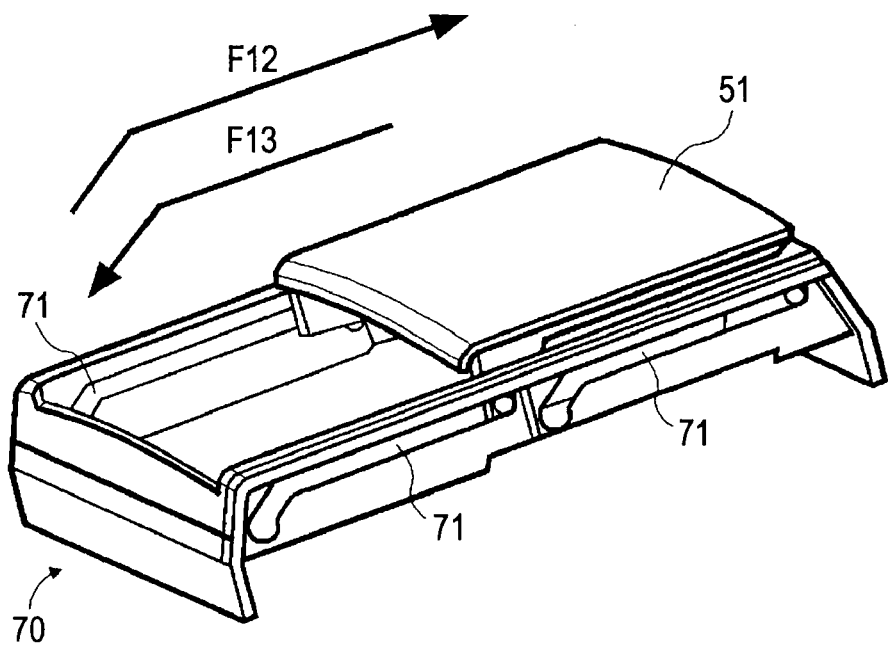
FIG. 8B summarizes how the cover slide mechanism shown in FIGS. 7 and 8A moves when opening and closing.

FIGS. 8A and 8B schematically illustrate the sliding movement of the cover 51 when opening and closing. The opening force F12 is an external force applied by the user, while the closing force F13 is applied by the internal spring 74. As described earlier, when the cover 51 is in the fully open position (i.e., the second stable position) as shown in FIG. 8B, the cover 51 is in a stable state and remains open even though the force of the spring 74 is at work. If the user then applies a slight force to the cover 51 in the closing direction and upsets the stable state, then the cover 51 automatically returns to the closed position (i.e., the first stable position) as a result of the closing force F13 imparted by the spring 74. In this way, the cover 51 has two positions where the cover is stably held, with one at either end of the predetermined slid path. In addition, a long and narrow space is respectively formed along either slide arm 63 between the arms and the underside of the cover 51, as easily seen in FIG. 7. This space accepts (i.e., houses) the tabular cover shelter 55 when the cover is closed as shown in FIG. 8B. As a result of the above configuration, the slide arms 63 firmly support the cover 51 while also working in conjunction with the slide grooves 71 when opening the cover, thereby enabling the cover 51 to ride onto the cover shelter 55.

FIGS. 9A to 9D schematically explain the operational principle of the cover lock mechanism. FIGS. 9A to 9D illustrate steps in a time series of sliding movement as a cover changes from a closed state to an open state in accordance with the present embodiment.

Figure 9A:
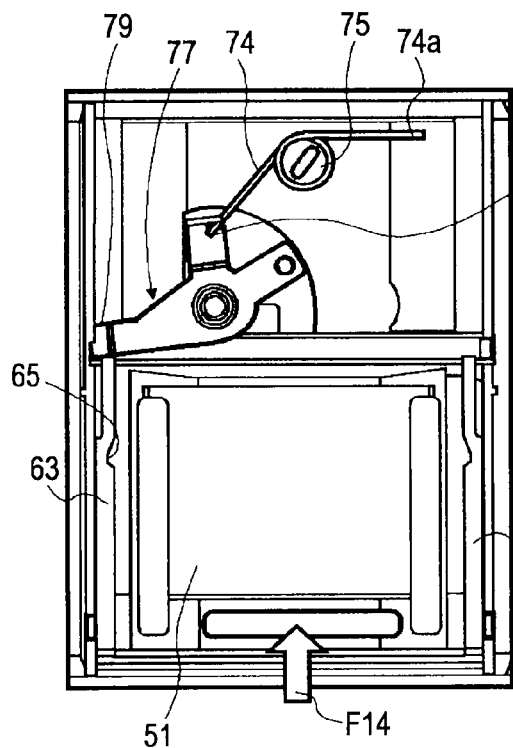
FIG. 9A is a diagram explaining the operational principle of the cover lock mechanism of the cover slide mechanism shown in FIG. 7.

FIG. 9A illustrates the closed cover state. Sliding movement is initiated in this state when the user applies an external force F14 to the cover 51. At this point, the tip of one of the slide arms 63 abuts the side of the lever tip 79 of the rotating lever 77. For this reason, movement of the slide arm 63 in the lengthwise direction presses the rotating lever 77 in opposition to the spring force, thereby causing the rotating lever 77 to rotate. If the external force F14 is removed at this point, then the cover 51 automatically returns to the initial position (i.e., the closed position) as a result of the force of the spring 74. If additional external force is continuously applied such that the cover 51 reaches the position shown in FIG. 9B, then the rotating lever 77 also rotates to the position shown in FIG. 9B. If the external force F15 is removed at this point, the cover 51 still automatically returns to the closed position.

Figure 9B:
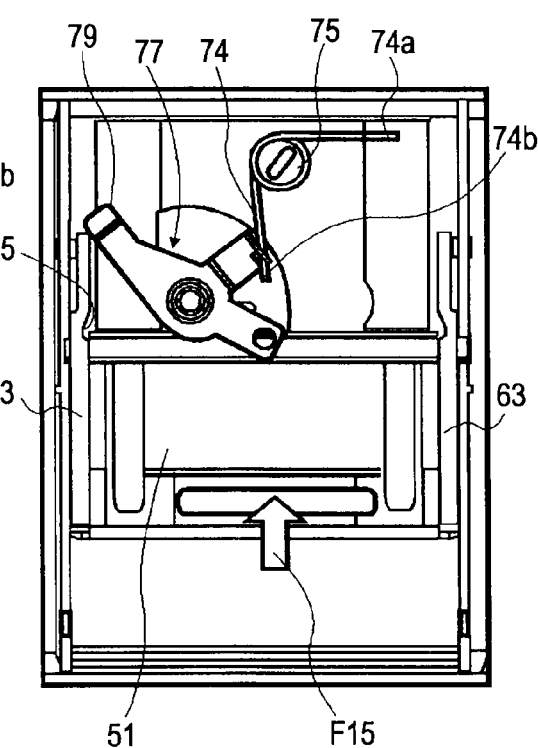
FIG. 9B is a diagram explaining the operational principle of the cover lock mechanism of the cover slide mechanism shown in FIG. 7.
Figure 9C:
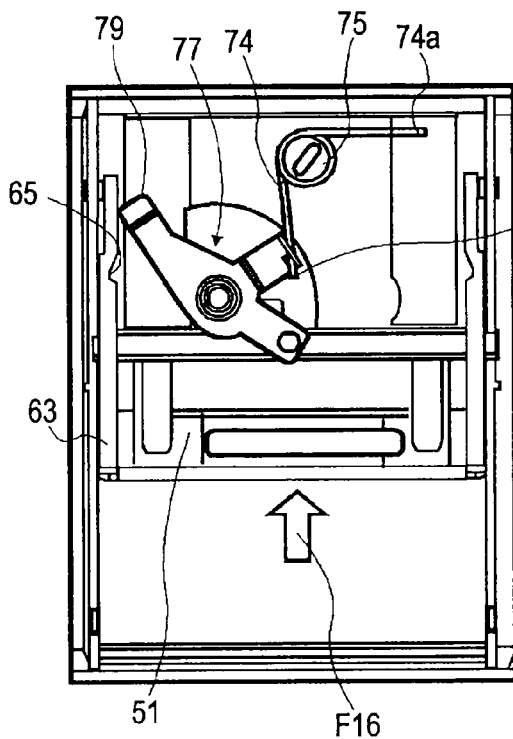
FIG. 9C is a diagram explaining the operational principle of the cover lock mechanism of the cover slide mechanism shown in FIG. 7.

However, if the user additionally and continuously applies an external force F16 to the cover 51, the rotating lever 77 rotates further, and as shown in FIG. 9C, the lever tip 79 of the rotating lever 77 rides onto and is stopped by the lateral surface of the slide arm 63. Once the lever tip 79 has ridden onto the lateral surface of the slide arm 63, the cover 51 no longer automatically returns to the closed position despite being subject to the force of the spring 74.

Figure 9D:
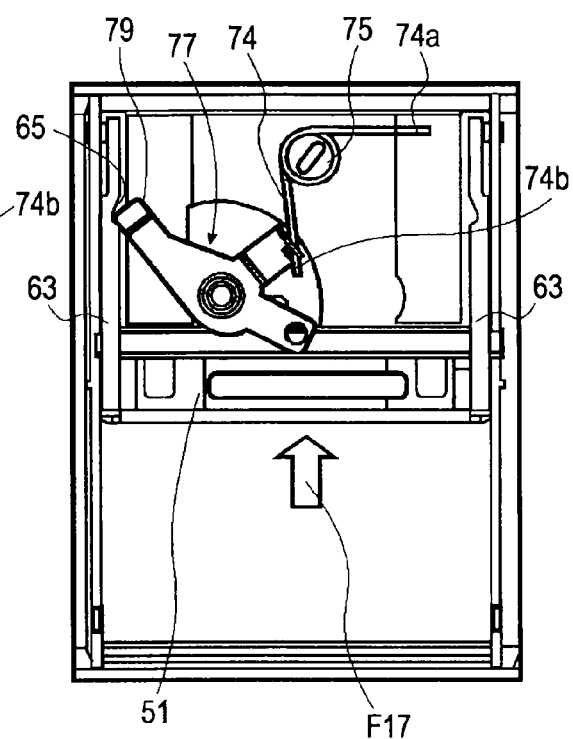
FIG. 9D is a diagram explaining the operational principle of the cover lock mechanism of the cover slide mechanism shown in FIG. 7.

Finally, if the rotating lever 77 reaches a stable position as a result of the external force F17 as shown in FIG. 9D, then the cover 51 remains stopped in the open position even if the external force F17 is removed. At this point, the tip of the rotating lever 77 falls into (i.e., fits together with) a recessed portion (i.e., a notch) 65 provided as an engaging portion on either slide arm 63. In so doing, the position of the engaged slide arm 63 is fixed in place on the slide path, and in addition, the minute impact generated at this point produces an operational click response with respect to the user. As a result, the user recognizes that the cover 51 has moved the full stroke and reached the lock position, and thus knows that the cover 51 will not close if the pressing force is released.

When returning to the closed cover state from the open cover state, the sequence follows the reverse of FIGS. 9A to 9D. More specifically, if the user applies force to the cover 51 in the closing direction while in the open state shown in FIG. 9D, the tip of the rotating lever 77 breaks away from the recessed portion 65 on the particular slide arm 63 and then rides onto the slide arm 63 as shown in FIG. 9C. If the user continues to apply such pressing force, the tip of the rotating lever 77 that has ridden onto the lateral surface of the slide arm 63 again returns to a state of abutting the tip of the slide arm 63, as shown in FIG. 9B. Having returned to this state, the cover 51 then automatically returns to the closed position as a result of the force of the spring 74, even if the user applies no further force. The distance moved by the cover 51 from that shown in FIG. 9D to that shown in FIG. 9B may be a portion of the full stroke performed when closing the cover (in the example shown in FIGS. 9A to 9D, the distance is approximately half that of the full stroke).

Figure 10A:
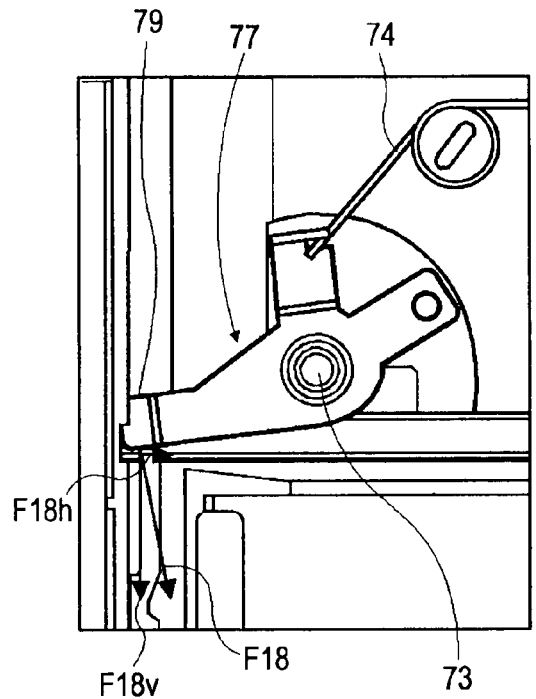
FIG. 10A is a diagram explaining in detail the cover slide mechanism shown in FIG. 7.

FIGS. 10A to 10D are diagrams explaining in detail the operational principle of the cover lock mechanism in accordance with the present embodiment. FIG. 10A illustrates the state wherein the cover 51 is in the closed position. In this state, the side of the tip 79 of the rotating lever 77 abuts the tip of one of the slide arms 63. As a result, the force of the spring 74 causes the lever tip 79 to press against the slide arms 63 in the lengthwise direction thereof, thereby urging the cover 51 in the closing direction. At this point, a force F18 is generated at the point of contact between the lever tip 79 and the arm tip. The force F18 contains a horizontal component F18$h$ and a vertical component F18$v$. When the user applies an external force greater than F18$v$, movement of the cover 51 in the open direction is initiated.

Figure 10B:
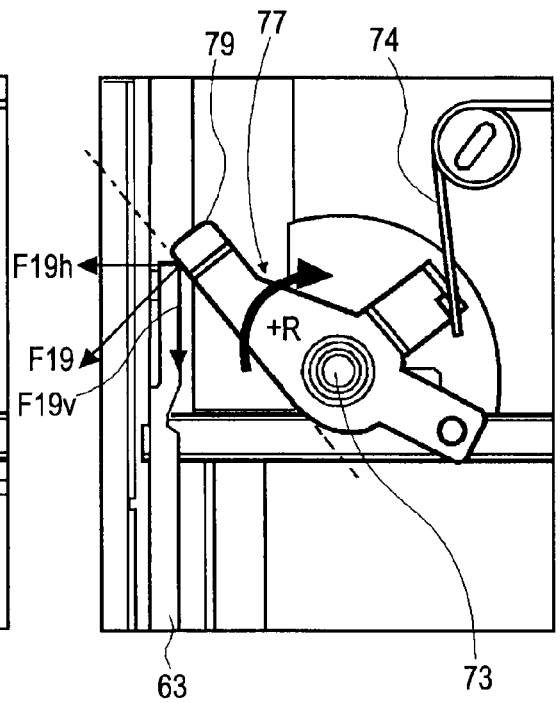
FIG. 10B is a diagram explaining in detail the cover slide mechanism shown in FIG. 7.

In FIG. 10B, the rotating lever 77 is rotating in the +R direction. The force generated at the lever tip 79 as a result of the spring 74 is herein labeled F19. At this point, the operative direction of the lever tip 79 lies at an angle of 45° with respect to the lengthwise direction of the arm (or the direction orthogonal thereto), and thus the force components F19$h$ and F19$v$ of F19 are equal in magnitude.

Figure 10C:
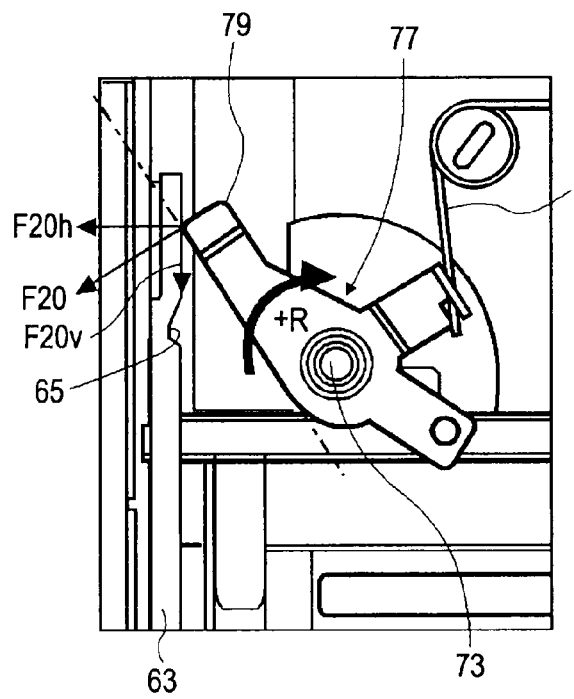
FIG. 10C is a diagram explaining in detail the cover slide mechanism shown in FIG. 7.

If the cover 51 continues to slide, then the vertical component F20$v$ of the force F20 becomes smaller than the horizontal component F20$h$, while in addition, the rotating lever 77 is prevented from rotating in the counter-clockwise direction, as shown in FIG. 10C. For these reasons, the rotating lever 77 becomes no longer able to push back the slide arm 63. As a result, the cover 51 no longer automatically returns to the closed position as a result of the force of the spring 74. Consequently, the boundary position between FIGS. 10B and 10C represents the boundary point of automatic return of the cover 51 by the force of the spring 74.

Figure 10D:
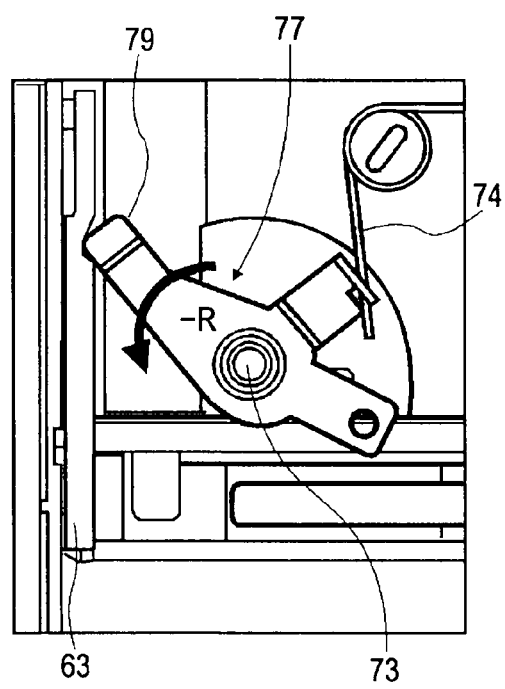
FIG. 10D is a diagram explaining in detail the cover slide mechanism shown in FIG. 7.

FIG. 10D illustrates the principle whereby the click response is generated. In the process whereby the cover 51 moves a full stroke, the rotating lever 77 continually rotates in the +R direction shown in FIGS. 10B and 10C. However, if the recessed portion 65 provided on either slide arm 63 reaches the rotational orbit of the tip 79 of the rotating lever 77, then the rotating lever 77 slightly rotates in the –R direction as a result of the force of the spring 74. At this point, the tip 79 of the rotating lever 77 collides with the lateral wall of the recessed portion 65, thereby producing a click response. In addition, the tip 79 of the rotating lever 77 applies a lateral force to the slide arm 63 equivalent to the horizontal component F20$h$ of the force F20 shown in FIG. 10C. As a result, the cover 51 becomes locked in place.

Figure 11:
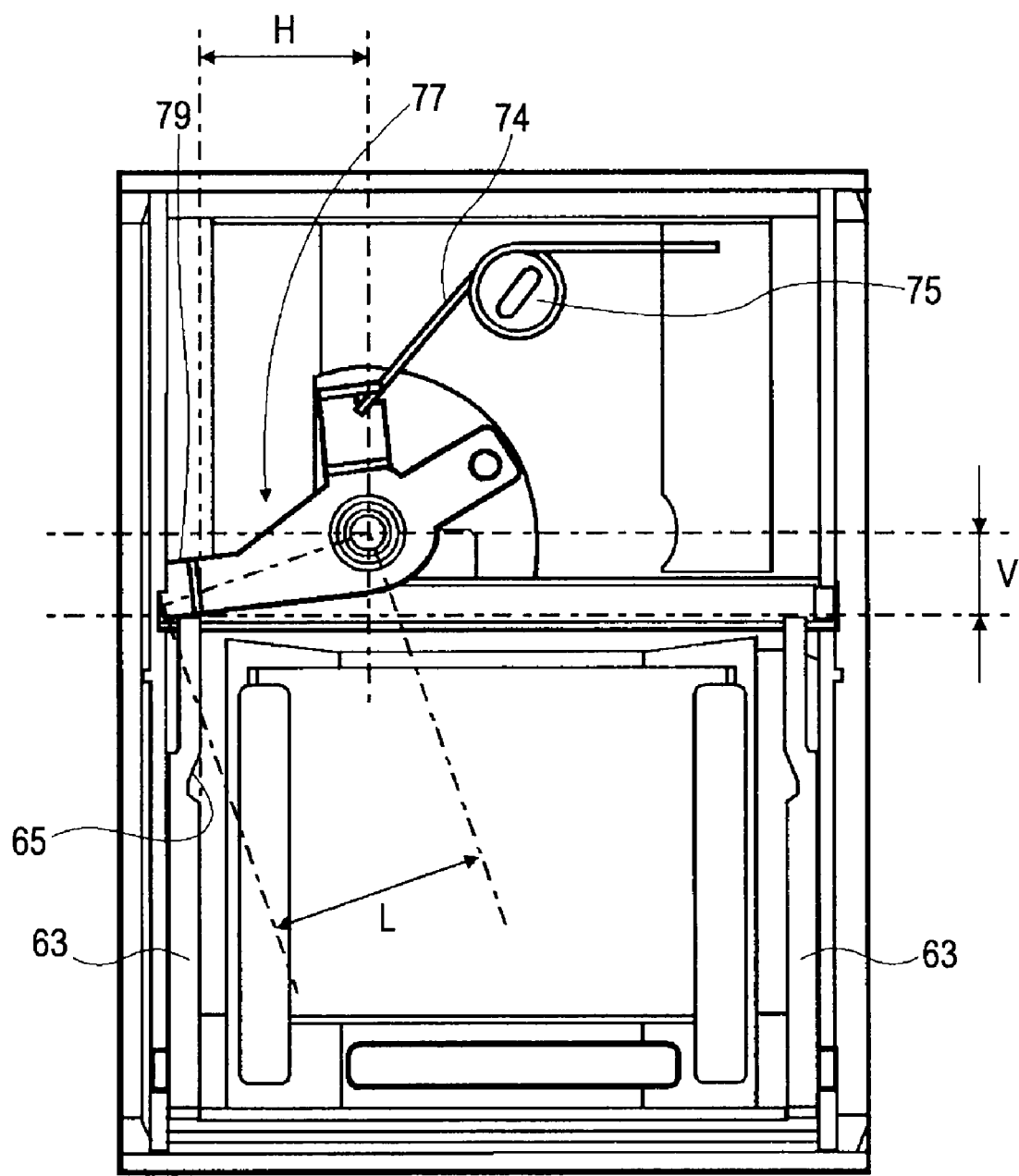
FIG. 11 is a diagram explaining the configuration of parameters for the automatic return range of the cover slide mechanism shown in FIG. 7.

FIG. 11 summarizes the configuration of parameters whereby the cover 51 automatically returns to the closed position up to a given position within the slide stroke range of the cover 51, and enters locked state upon exceeding the given position.

In FIG. 11, a distance H is defined as the distance from the rotational center of the rotating lever 77 to a line extending along and past the inner lateral surface of the nearer slide arm 63. A distance L is defined as the distance from the rotational center of the rotating lever 77 to the lever tip 79 (i.e., the length of the arm of the lever tip 79). The relationship between L and H is such that L>H. Furthermore, the distance L is of sufficiently short length so as not to abut the lateral surface of the chassis, thereby enabling the rotating lever 77 to rotate freely in the absence of the slide arm 63. A distance V is also defined as the vertical distance between the tips of the slide arms 63 and the rotational center of the rotating lever 77. If V is taken to be a positive value while in the closed state, then V gradually reduces to 0 as the slide arms 63 slide from the closed state. If sliding subsequently continues in the same direction, then the distance V gradually becomes larger in the negative range. During this process, the lever tip 79 rides onto the inner lateral surface of the nearer slide arm 63. In this state, the cover 51 enters a locked state. Consequently, by appropriately setting the values of the distances L and H, it is possible to configure the range wherein the cover 51 automatically returns to the closed position as a result of the force of the spring 74.

A modification of the present embodiment will now be described. In the foregoing embodiment, a single rotating lever was used. Consequently, the transmission of force between the slide arms 63 of the cover unit 60 and the rotating lever 77 occurred with respect to only one of the slide arms 63. In contrast, FIGS. 12A and 12B illustrate an example wherein, in addition to the rotating lever 77 that engages one of the slide arms 63, a driven lever 87 has been added as another rotating lever that engages the other slide arm 63. FIGS. 12A and 12B correspond to the closed cover state and the open cover state, respectively. The rotating lever 77 and the driven lever 87 are mutually rotatably coupled by a link 84 of the coupling arms 76 and 86 respectively protruding in the direction opposite that of the corresponding lever tips 79 and 89. In addition, it becomes possible for the spring 74 to be shared by both rotating levers as a result of such a coupling. Obviously, two sets of a rotating lever 77, a spring 74, and a spring support 75 may also be provided to respectively act on the slide arms 63. In such a case, the coupling arms 76 and 86 may be omitted.

Basic operation was achieved by means of the single rotating lever configuration of the foregoing embodiment as a result of either slide arm 63 being guided by the slide grooves 71. However, by providing two sets of rotating levers like that described in the present modification, urging force is equally applied to either slide arm of the cover unit instead of being applied to just one slide arm. In so doing, the rotating operation of the rotating levers is converted into smooth, linear slide movement. As a result, it is expected that the operation of the cover 51 can be made significantly smoother and provided at significantly lower cost. However, it should be appreciated that the fundamental operational concept of the present modification remains unchanged from that of the foregoing embodiment.

Figure 13:
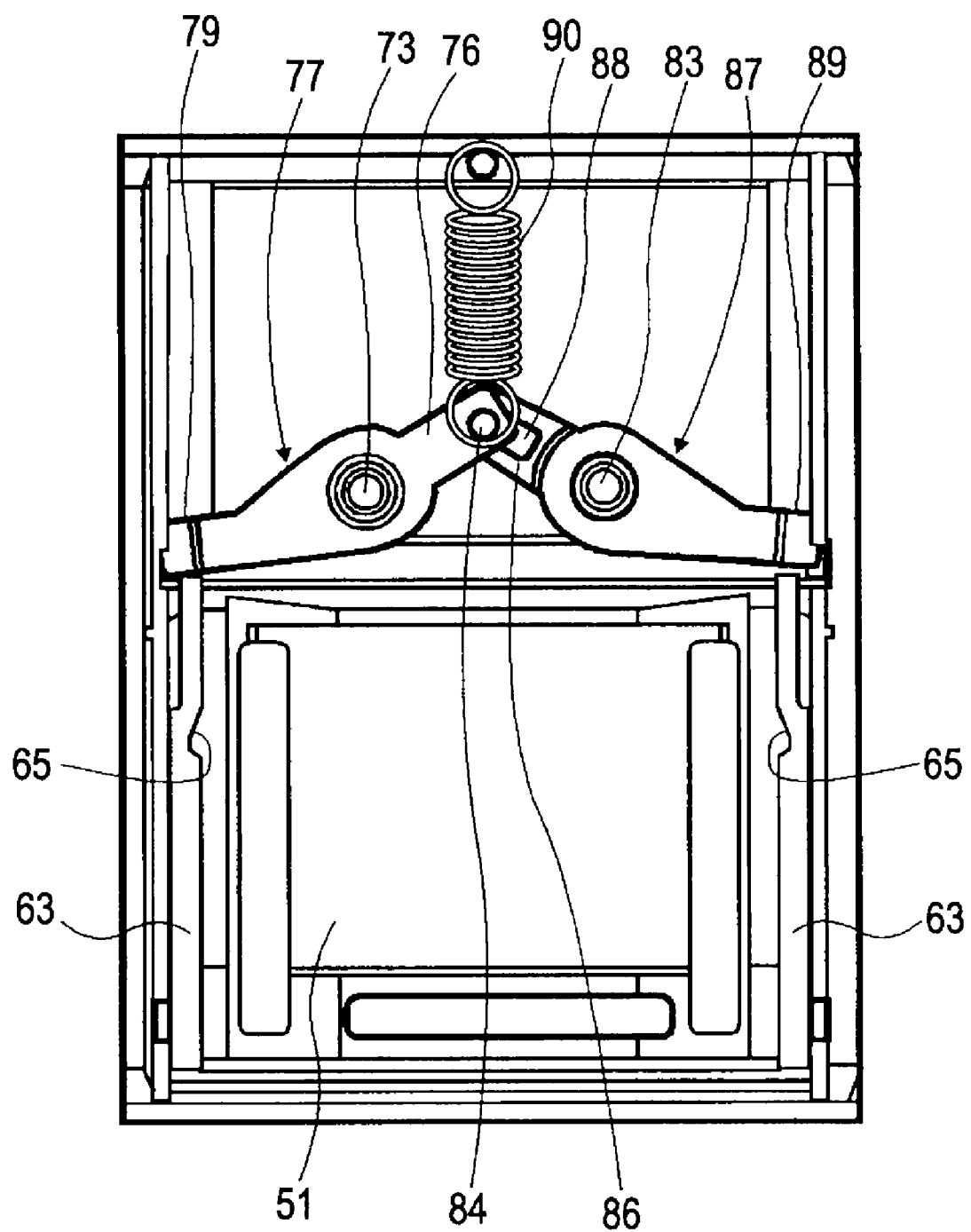
FIG. 13 illustrates a second modification of an embodiment of the present invention.

FIG. 13 illustrates another modification of the present embodiment. In the foregoing configuration, a torsion spring was described by way of example as the elastic member constituting the urging means. In the present modification, an extension coil spring 90 is used by way of example. It is also possible to use a compression coil spring by modifying the position of the spring. In addition, the elastic member herein is not limited to springs, and a suitable arbitrary component may be used.

The configuration shown in FIG. 13 is based on the double rotating lever configuration shown in FIG. 12, but it is also possible to adapt the configuration shown in FIG. 13 to the single rotating lever configuration shown in FIG. 7 and elsewhere.

Figure 14A:
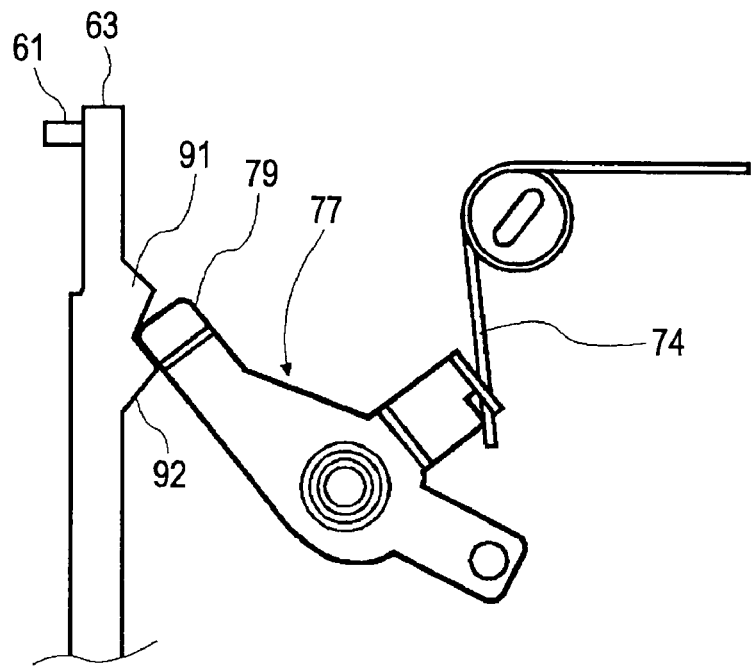
FIG. 14A illustrates a third modification of an embodiment of the present invention.
Figure 14B:
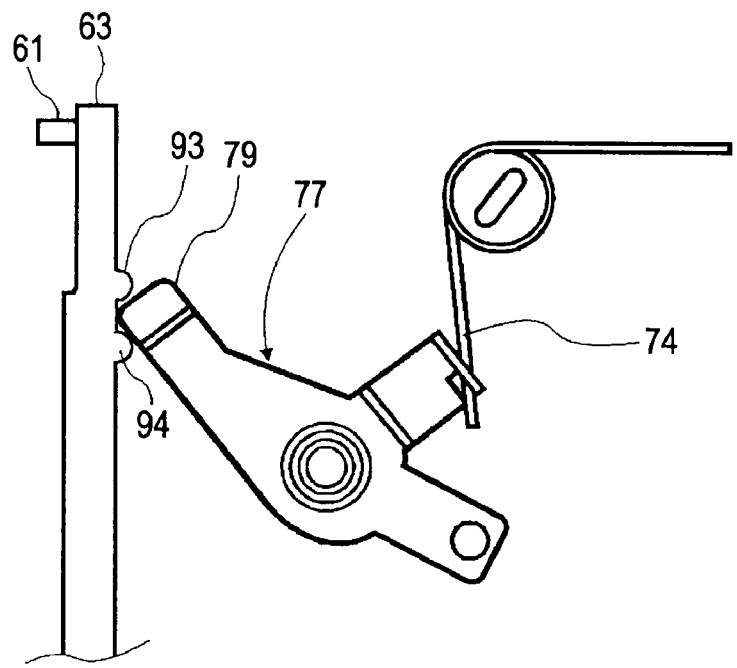
FIG. 14B illustrates a third modification of an embodiment of the present invention.

FIGS. 14A and 14B illustrate further modifications of the present embodiment, wherein the configuration has been modified to obtain a different click response. In the foregoing configuration, a recessed portion 65 was provided on the lateral surface of either slide arm 63 as an engaging portion for obtaining a click response, but the present invention is not limited to such a configuration. For example, as shown in FIG. 14A, protruding portions (i.e., bumps) 91 and 92 having slanted surfaces may be combined to form a recessed portion therebetween. The resulting recessed portion the stable position for the cover unit when the cover is opened. Furthermore, since the position of maximum extension of the slide arms 63 is determined by the configuration of the actual device, the protruding portion 92 may be omitted in some cases. In addition, instead of slanted protruding portions, simple hemispherical or semi-cylindrical protruding portions 93 and 94 may be provided as shown in FIG. 14B. In such a case, the protruding portion 94 may also be similarly omitted.

According to an embodiment of the present invention, the following excellent advantages are obtained.

(1) The range within the slide stroke whereby the cover unit automatically returns to the closed position as a result of the spring force can be set simply by configuring the relative positions of two points on the cover unit and the rotating lever.

(2) There is a smooth transition as well as a clear separation between the user-operated cover opening operation and the automatic return operation.

(3) The cover unit can be locked without providing an independent lock mechanism to oppose the spring force. In so doing, the configuration and management of force parameters for locking can be omitted.

(4) An operational click response is produced without providing an independent click generating mechanism. In addition, the configuration and management of force parameters for generating clicks can be omitted.

(5) Omission of an independent lock mechanism and click generating mechanism results in a simpler configuration, thus reducing the possibility of mechanism damage or malfunction due to drop impact or similar events.

(6) Thus, according to an embodiment of the present invention, simplification of the device mechanism is realized without impacting device usability.

For example, the slide apparatus in accordance with an embodiment of the present invention is herein described taking the example of a mobile phone. However, it should be appreciated that the present invention is not strictly limited to mobile phones. For example, an embodiment of the present invention may also be applied to a digital camera, a mobile handset provided with a camera function, a compact PC, or a handheld game console. Moreover, the present invention is not strictly limited to portable devices.

An embodiment of the present invention was described as being applied to the cover of a camera unit. However, it should be appreciated that the present invention is not limited to a camera cover mechanism, and that embodiments thereof may be applied to general cover mechanisms that open and close by sliding.

The slide arm member and the slide path are not limited to being linear, and may also be curved to some degree. The present application contains subject matter related to that disclosed in Japanese Priority Patent Application JP filed in the Japan Patent Office on Apr. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lock mechanism for a sliding object, comprising:
   a slide arm member configured to support the sliding object and to be slidable along a predetermined slide path;
   a rotating lever member having a tip that abuts one end of the slide arm member and configured to rotate about a fixed rotational axis; and urging means configured to apply an urging force that causes the rotating lever member to rotate in a given direction such that the slide arm member is urged along the slide path and toward one end thereof; wherein when an external pressing force presses the slide arm member in opposition to the urging force of the urging means, the slide arm member is moved along the slide path, thereby causing the rotating lever member to rotate in the direction that is the opposite of the given direction, and when the slide arm member is additionally and continuously pressed, the tip of the rotating lever member rides onto and is stopped against the lateral surface of the slide arm member, such that the slide arm member and the rotating lever member remain stopped at the current position even if the pressing force is released.

2. The lock mechanism according to claim 1, wherein the slide arm member includes an engaging portion provided on the lateral surface onto and by which the tip of the rotating lever member rides and is stopped, and wherein the engaging portion causes the position of the slide arm member to become fixed on the slide path while additionally causing an operational click response to be produced.

3. The lock mechanism according to claim 2, wherein the slide arm member includes a recessed portion or protruding portion as the engaging portion provided on the lateral surface onto and by which the tip of the rotating lever member rides and is stopped, and wherein when the tip of the rotating lever member rides onto and is stopped by the lateral surface, a portion of the tip fits into the recessed portion or rides over the protruding portion.

4. The lock mechanism according to any of claims 1 to 3, wherein the slide arm member includes a first and a second slide arm that slide in parallel, the rotating lever member includes a first and a second rotating lever corresponding to the first and the second slide arm, and wherein the single urging means is shared by both the first and the second rotating lever.

5. A slide apparatus that stably holds a sliding object sliding along a predetermined slide path at two points on the slide path, the slide apparatus comprising:

a slide arm member configured to support the sliding object and to be slidable along a predetermined slide path;

a rotating lever member having a tip that abuts one end of the slide arm member and configured to rotate about a fixed rotational axis; and urging means configured to apply an urging force that causes the rotating lever member to rotate in a given direction such that the slide arm member is urged along the slide path and toward one end thereof; wherein when an external pressing force presses the slide arm member in opposition to the urging force of the urging means, the slide arm member is moved along the slide path, thereby causing the rotating lever member to rotate in the direction that is the opposite of the given direction, and when the slide arm member is additionally and continuously pressed, the tip of the rotating lever member rides onto and is stopped against the lateral surface of the slide arm member, such that the slide arm member and the rotating lever member remain stopped at the current position even if the pressing force is released.

6. The slide apparatus according to claim 5, further comprising:

one or more slide guides configured to determine the slide path;

wherein the one or more slide guides include a step such that the sliding object rides onto the surface of the chassis of the slide apparatus when sliding from a closed position to an open position.

7. The slide apparatus according to claim 5, wherein the slide arm member includes an engaging portion provided on the lateral surface onto and by which the tip of the rotating lever member rides and is stopped, and wherein the engaging portion causes the position of the slide arm member to become fixed on the slide path while additionally causing an operational click response to be produced.

8. The slide apparatus according to according to claim 7, wherein the slide arm member includes a recessed portion or protruding portion as the engaging portion provided on the lateral surface onto and by which the tip of the rotating lever member rides and is stopped, and wherein when the tip of the rotating lever member rides onto and is stopped by the lateral surface, a portion of the tip fits into the recessed portion or rides over the protruding portion.

9. The slide apparatus according to any of claims 5 to 8, wherein the slide arm member includes a first and a second slide arm that slide in parallel, the rotating lever member includes a first and a second rotating lever corresponding to the first and the second slide arm, and wherein the single urging means is shared by both the first and the second rotating lever.

10. A mobile handset apparatus, comprising:

a camera unit;

a cover able to be opened and closed with respect to the camera unit;

a slide arm member configured to support the cover and to be slidable along a predetermined slide path;

a rotating lever member having a tip that abuts one end of the slide arm member and configured to rotate about a fixed rotational axis; and urging means configured to apply an urging force that causes the rotating lever member to rotate in a given direction such that the slide arm member is urged along the slide path and toward one end thereof; wherein when an external pressing force presses the slide arm member in opposition to the urging force of the urging means, the slide arm member is moved along the slide path, thereby causing the rotating lever member to rotate in the direction that is the opposite of the given direction, and when the slide arm member is additionally and continuously pressed, the tip of the rotating lever member rides onto and is stopped against the lateral surface of the slide arm member such that the slide arm member and the rotating lever member remain stopped at the current position even if the pressing force is released.

* * * * *